(12) United States Patent
Kwon

(10) Patent No.: US 7,862,928 B2
(45) Date of Patent: Jan. 4, 2011

(54) CAN FOR A BATTERY AND BATTERY USING THE SAME

(75) Inventor: Teak Hyen Kwon, Youngin-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 8 days.

(21) Appl. No.: 11/288,438

(22) Filed: Nov. 29, 2005

(65) Prior Publication Data

US 2006/0141354 A1    Jun. 29, 2006

(30) Foreign Application Priority Data

Nov. 29, 2004    (KR) ...................... 10-2004-0098860

(51) Int. Cl.
*H01M 2/04* (2006.01)
(52) U.S. Cl. ................... 429/176; 429/163; 429/167
(58) Field of Classification Search ......... 429/163–169, 429/176, 177
See application file for complete search history.

(56) References Cited

U.S. PATENT DOCUMENTS

| 3,390,017 | A | * | 6/1968 | Hennigan ................. 429/59 |
| 5,250,373 | A | * | 10/1993 | Muffoletto et al. ........ 429/161 |
| 2002/0150817 | A1 | | 10/2002 | Grubb et al. |
| 2003/0017390 | A1 | * | 1/2003 | Probst et al. ............... 429/176 |

FOREIGN PATENT DOCUMENTS

| JP | 07-314056 | 12/1995 |
| JP | 2002-358946 A | 12/2002 |
| JP | 2005-294012 A | 10/2005 |
| KR | 2000-0005155 | 3/2000 |

* cited by examiner

*Primary Examiner*—Patrick Ryan
*Assistant Examiner*—Ben Lewis
(74) *Attorney, Agent, or Firm*—Lee & Morse, P.C.

(57) ABSTRACT

A can includes a body receiving an electrode assembly of a battery and a bottom wall protruding downward from the body and having a convex bottom surface such that the bottom wall does not bend toward an inner portion of the can when the body is compressed.

19 Claims, 5 Drawing Sheets

CAN FOR A BATTERY AND BATTERY USING THE SAME

BACKGROUND OF THE INVENTION

1. Field of the Invention

The present invention relates to a can and a battery using the same. More particularly, the present invention relates to a can and a battery using the same, in which a bottom wall of the can protrudes downward while forming a convex bottom surface such that the bottom wall of the can is prevented from being bent toward an inner portion of the can when the battery is compressed.

2. Description of the Prior Art

Recently, portable wireless appliances, such as video cameras, cellular phones and laptop computers, have been fabricated to be light-weight while performing various functions. This proliferation of portable wireless appliances has increased demand for secondary batteries used as power sources for the portable wireless appliances. Such secondary batteries include Ni—Cd batteries, Ni—MH batteries, Ni—Zn batteries and lithium batteries. Of particular interest are lithium secondary batteries, which are rechargeable, compact and have a high capacity. The lithium secondary batteries provide a high operational voltage and high energy density per unit weight, so they are extensively used in the advanced electronic technology fields.

FIG. 1 illustrates an exploded perspective view of a conventional lithium secondary battery. The lithium secondary battery includes an electrode assembly 112 having a positive electrode plate 113, a negative electrode plate 115 and a separator 114 in a can 110. The electrode assembly 112 is provided together with an electrolyte in the can 110 by sealing an upper opening 110a of the can 110 using a cap assembly 120.

In general, the can 110 is made from aluminum or an aluminum alloy through a deep drawing process. A bottom wall 110b of the can 110 has a substantially planar shape.

The electrode assembly 112 is formed by interposing the separator 114 between the positive and negative plates 113 and 115 and winding them into a jelly-roll structure. A positive electrode tap 116 is attached to the positive electrode plate 113 and protrudes upward out of the electrode assembly 112. A negative electrode tap 117 is attached to the negative electrode plate 115 and protrudes upward out of the electrode assembly 112. The positive electrode tap 116 is spaced apart from the negative electrode tap 117 by a predetermined distance such that they are electrically insulated from each other. In general, the positive and negative electrode taps 116 and 117 are made from Ni.

The cap assembly 120 includes a cap plate 140, an insulating plate 150, a terminal plate 160 and an electrode terminal 130. The cap assembly 120 is accommodated in an insulating case 170 and attached to the upper opening 110a of the can 110, thereby sealing the can 110.

The cap plate 140 is made from a metal plate having a size and a shape corresponding to those of the upper opening 110a of the can 110. The cap plate 140 includes a first terminal hole 141 having a predetermined size at the center of the cap plate 140. The electrode terminal 130 is inserted into the first terminal hole 141. When the electrode terminal 130 is inserted into the first terminal hole 141, a gasket tube 146 is provided around the electrode terminal 130 in order to insulate the electrode terminal 130 from the cap plate 140. An electrolyte injection hole 142 is formed at one side of the cap plate 140 with a predetermined size. After the cap assembly 120 has been assembled with the upper opening 110a of the can 110, the electrolyte is injected into the can 110 through the electrolyte injection hole 142. Then, the electrolyte injection hole 142 is sealed with a separate sealing unit (not shown).

The electrode terminal 130 is connected to the negative electrode tap 117 of the negative electrode plate 115 or the positive electrode tap 116 of the positive electrode plate 113 so that the electrode terminal 130 may serve as a negative electrode terminal or a positive electrode terminal.

The insulating plate 150 is made from an insulating material identical to the material for the gasket tube 146 and is coupled with the lower surface of the cap plate 140. The insulating plate 150 is formed with a second terminal hole 151, which is aligned corresponding to the first terminal hole 141 of the cap plate 140 and into which the electrode terminal 130 is inserted. A resting recess 152 is formed on a lower surface of the insulating plate 150, and has a size and a shape corresponding to those of the terminal plate 160 such that the terminal plate 160 can fit in the resting recess 152.

The terminal plate 160 is made from a Ni alloy and is coupled with the lower surface of the insulating plate 150. The terminal plate 160 is formed with a third terminal hole 161, which is aligned corresponding to the first terminal hole 141 of the cap plate 140 and into which the electrode terminal 130 is inserted. Since the electrode terminal 130 inserted into the first terminal hole 141 of the cap plate 140 is insulated from the terminal plate 140 by the gasket tube 146, the terminal plate 160 can be electrically connected to the electrode terminal 130 while being electrically insulated from the cap plate 140.

The negative electrode tap 117 attached to the negative electrode plate 115 is welded to one side of the terminal plate 160 and the positive electrode tap 116 attached to the positive electrode plate 113 is welded to the other side of the terminal plate 160. In order to weld the positive and negative electrode taps 116 and 117 to the terminal plate 160, a resistance welding process or a laser welding process is performed. Typically, the resistance welding process is used for welding the positive and negative electrode taps 116 and 117 to the terminal plate 160.

As the energy density of the battery increases, the size of the battery is decreased, making it more vulnerable to impact and compression. Thus, if the battery is subject to such impact or compression, the electrode assembly accommodated in the can may be deformed, thereby causing the short circuit between electrode plates and accidental ignition or explosion of the lithium battery.

In particular, as shown in FIG. 1, when the longitudinal compression test, which is one of safety tests for batteries, is performed by applying a compression force Fa, the battery is deformed about the longitudinal axis (b) thereof. As a result, the bottom wall 110b of the can 110 is bent toward the inner portion of the can 110, thereby locally compressing a lower portion of the electrode assembly, causing a short circuit between electrode plates of the electrode assembly.

SUMMARY OF THE INVENTION

The present invention is therefore directed to a can for a battery and a battery using the same, which substantially overcomes one or more of the problems due to the limitations and disadvantages of the related art.

It is a feature of an embodiment of the present invention to provide a can and a battery using the same, in which a bottom wall of the can protrudes downward while forming a convex bottom surface.

It is another feature of an embodiment of the present invention to provide a can and a battery using the same, such that the bottom wall of the can is prevented from being bent toward an inner portion of the can when the battery is compressed in a direction perpendicular to a longitudinal axis thereof, thereby improving safety of the battery.

At least one of the above and other features and advantages of the present invention may be realized by providing a can for a battery including an electrode assembly having a positive electrode plate, a negative electrode plate and a separator interposed between the positive and negative electrode plates, the can including a body to receive the electrode assembly and a bottom wall protruding downward from the body and having a convex surface.

At least one of the above and other features and advantages of the present invention may be realized by providing a battery including an electrode assembly including a positive electrode plate, a negative electrode plate and a separator interposed between the positive and negative electrode plates, and a can including a body accommodating the electrode assembly therein and a bottom wall, the bottom wall protruding downward from the body and having a convex surface.

The body may have an open substantially box-shaped structure including opposing front and rear walls and lateral sidewalls. The bottom wall may be rounded lengthwise along long-lateral sides thereof at a predetermined curvature. The bottom wall may be rounded widthwise along short-lateral sides thereof at a predetermined curvature. The bottom wall may be rounded lengthwise and widthwise along long-lateral sides and short-lateral sides thereof at a predetermined curvature. A vertex of the bottom wall may have a height of at least about 0.1 mm, at least about 50% of a thickness of the bottom wall and/or less than about 2 mm. The bottom wall may include a planar surface having a predetermined size, which may correspond to a size of a lead plate to be welded to the bottom wall of the can. The planar surface may be in a center portion of the bottom wall and may be at a vertex of the bottom wall. The body and the bottom wall are integral. The body and the bottom wall may be of a same material.

BRIEF DESCRIPTION OF THE DRAWINGS

The above and other features and advantages of the present invention will become more apparent to those of ordinary skill in the art by describing in detail exemplary embodiments thereof with reference to the attached drawings in which.

DETAILED DESCRIPTION OF THE INVENTION

Figure 1:
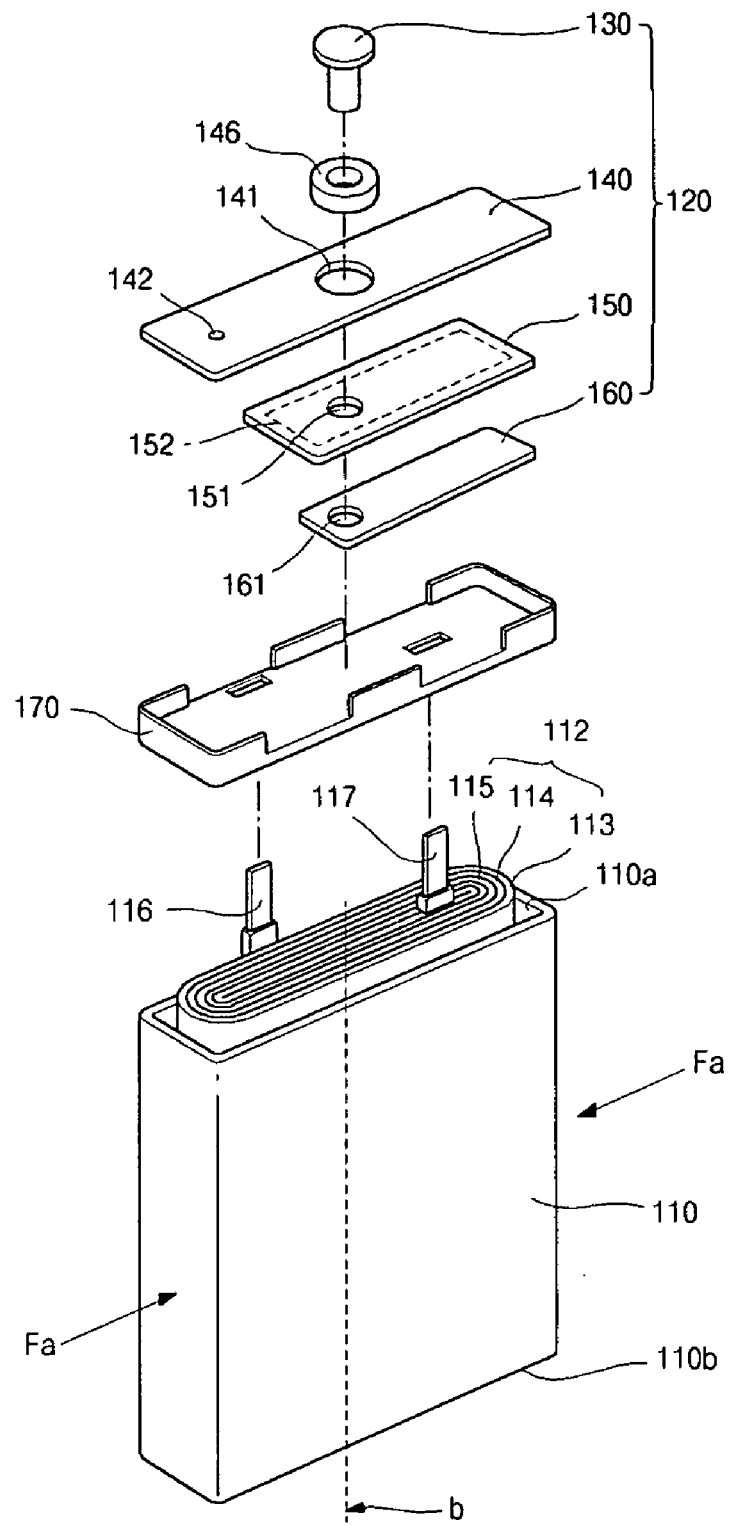
FIG. 1 illustrates an exploded perspective view of a conventional lithium secondary battery.

Korean Patent Application No. 2004-0098860, filed on Nov. 29, 2004, in the Korean Intellectual Property Office, and entitled: "Can for Lithium Secondary Battery and Lithium Secondary Battery Using the Same," is incorporated by reference herein in its entirety.

The present invention will now be described more fully hereinafter with reference to the accompanying drawings, in which exemplary embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. In the figures, the dimensions of layers and regions are exaggerated for clarity of illustration. Like reference numerals refer to like elements throughout.

Figure 2A:
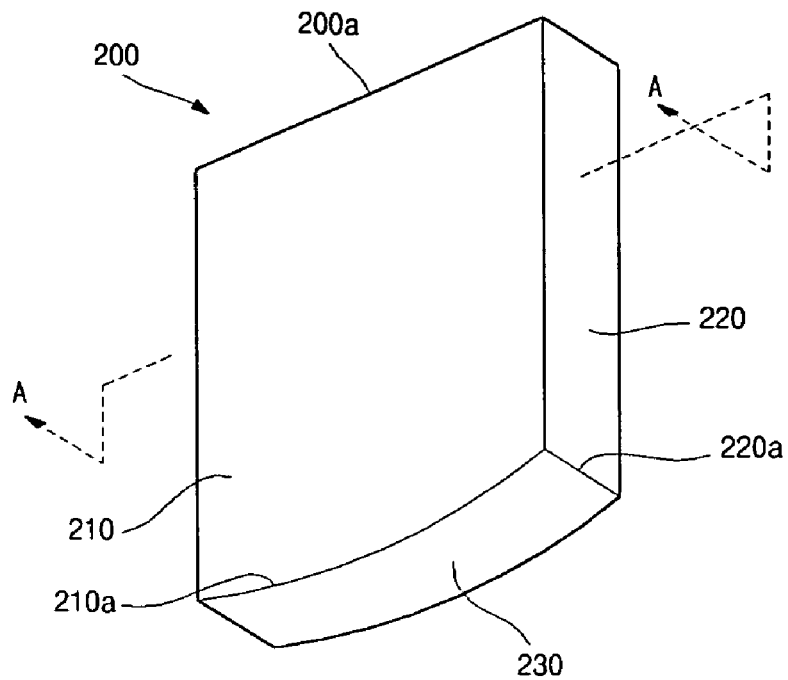
FIG. 2A illustrates a perspective view of a can for a lithium secondary battery according to a first embodiment of the present invention.
Figure 2B:
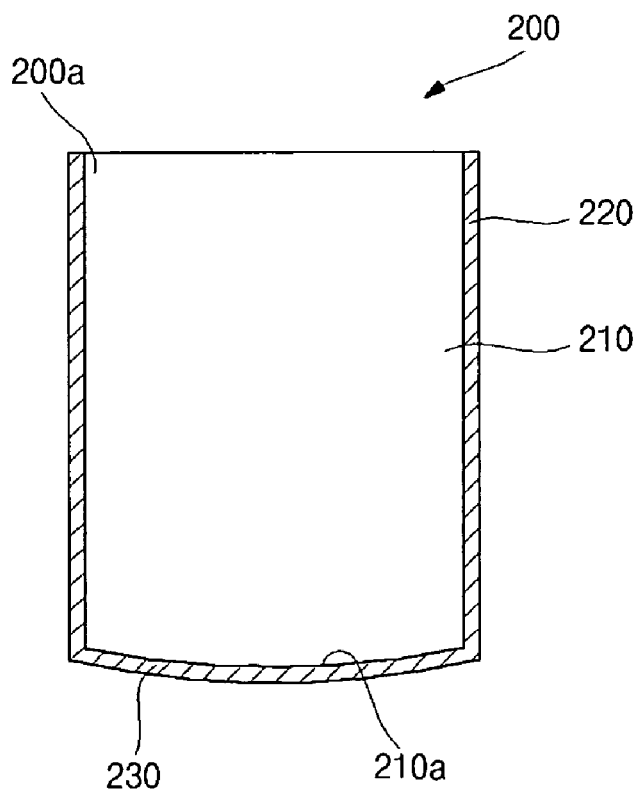
FIG. 2B illustrates a sectional view taken along line A-A shown in FIG. 2A.

FIG. 2A illustrates a perspective view of a can 200 for a battery according to a first embodiment of the present invention. FIG. 2B is a sectional view taken along line A-A shown in FIG. 2A.

Referring to FIGS. 2A and 2B, the can 200 according to the first embodiment of the present invention has front and rear walls 210, lateral sidewalls 220 and a bottom wall 230. The can 200 may be made of metal, preferably a lightweight and flexible metal, e.g., aluminum or an aluminum alloy. However, the materials for the can 200 are not so limited.

The front and rear walls 210 may be integrally formed with the lateral sidewalls 220 and the bottom wall 230, e.g., using a deep drawing process. The front and rear walls 210 of the can 200 are opposite to and spaced apart from each other, thereby forming front and rear surfaces of the can 200. The lateral sidewalls 220 of the can 200 are opposite to and spaced apart from each other, thereby forming left and right lateral surfaces of the can 200.

Although the lateral sidewalls 220 of the can 200 are shown as having planar surfaces, the lateral sidewalls 220 of the can 200 may have convex surfaces. That is, if the lateral surfaces of an electrode assembly accommodated in the can 200 have convex surfaces, the lateral sidewalls 220 of the can 200 may also have convex surfaces corresponding to the lateral surfaces of the electrode assembly. Similarly, while the body of the can 200 formed by the front and rear walls 210 and the lateral sidewalls 220 is shown is having an open substantially box-shaped structure may be any shape convenient for surrounding the electrode assembly.

The bottom wall 230 forms a bottom surface of the can 200. The bottom wall 230 of the can 200 may protrude downward from the body, i.e., from the front and rear walls 210 and the lateral sidewalls 220, and may have a convex surface. In detail, the bottom wall 230 may be rounded lengthwise along long-lateral sides 210a thereof (which may also serve as lower sides of the front and rear walls 210 of the can 200) in a predetermined curvature. That is, the bottom wall 230 of the can 200 may gradually protrude downward from both short-lateral sides 220a thereof along the long-lateral sides 210a, thereby forming the convex bottom surface of the can 200. The bottom wall 230 of the can 200 may not be rounded widthwise along the short-lateral sides 220a thereof. Accordingly, the bottom wall 230 together with the front and rear walls 210 of the can 200 form a U-shaped structure, as can be seen in FIG. 2B.

The bottom wall 230 may protrude downward by a height of at least about 0.1 mm. The convex bottom surface may be a curved surface having a maximum height corresponding to at least about 50% of the thickness of the bottom wall 230. That is, a longitudinal distance between a first virtual horizontal plane at a bottom of the body, i.e., a boundary plane between the body and the bottom wall 230, and a second virtual horizontal plane at a vertex of the convex bottom surface, i.e., a plane tangential to the vertex, may be equal to or greater than about 50% of a thickness of the bottom wall 230. If the height of the convex bottom surface is too small, the convex bottom surface has a small curvature, so that the bottom wall 230 of the can 200 may not be effectively bent outward when the can 200 is subject to longitudinal compression. In contrast, if the height of the convex bottom surface is too large, the size of the battery increases without increasing its capacity. Accordingly, the height of the convex bottom surface of the bottom wall 230 must be properly determined according to the type and capacity of the battery. The height of the convex bottom surface of the bottom wall 230 may be less than about 2 mm.

Figure 3A:
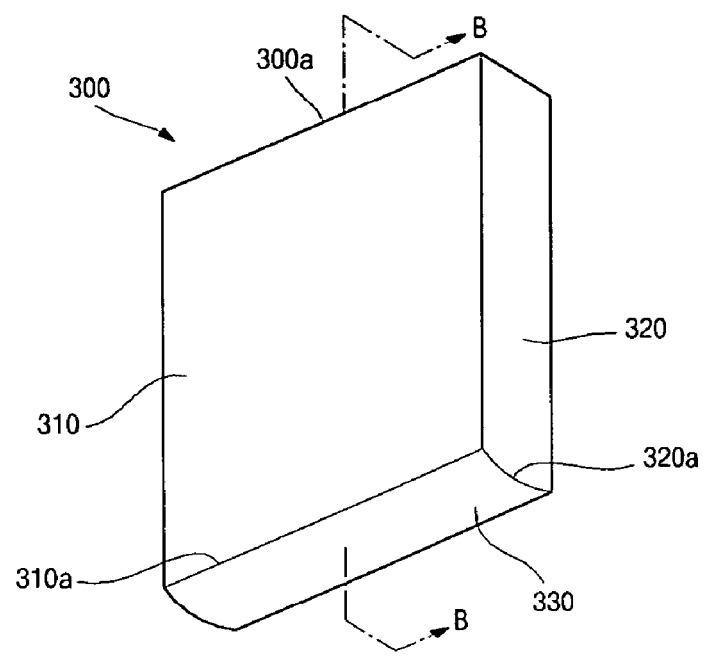
FIG. 3A illustrates is a perspective view of a can for a lithium secondary battery according to a second embodiment of the present invention.
Figure 3B:
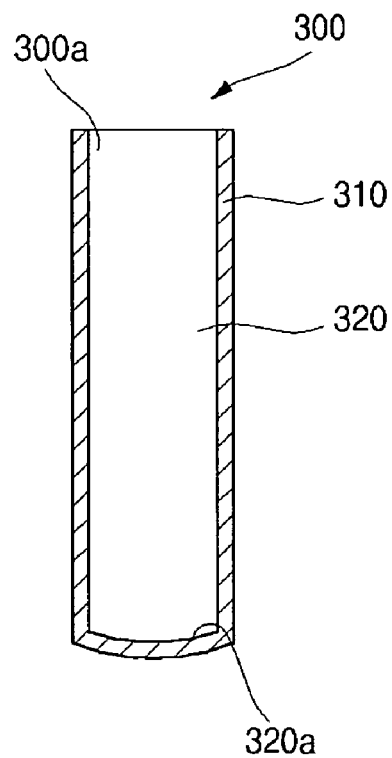
FIG. 3B illustrates a sectional view taken along line B-B shown in FIG. 3A.

FIG. 3A illustrates a perspective view of a can 300 for a battery according to a second embodiment of the present invention. FIG. 3B illustrates a sectional view taken along line B-B shown in FIG. 3A.

Referring to FIGS. 3A and 3B, the can 300 according to the second embodiment of the present invention includes a bottom wall 330 protruding downward while forming a convex bottom surface. In detail, the bottom wall 330 may be rounded widthwise along short-lateral sides 320a thereof (which may also serve as lower sides of lateral sidewalls 320 of the can 300) in a predetermined curvature. That is, the bottom wall 330 of the can 300 may gradually protrude downward from both long-lateral sides 310a thereof along the short-lateral sides 320a, thereby forming the convex bottom surface of the can 300. The bottom wall 330 of the can 300 may not be rounded lengthwise along the long-lateral sides 310a thereof. Accordingly, the bottom wall 330 together with the lateral sidewalls 320 forms a U-shaped structure, as shown in FIG. 3B.

The bottom wall 330 may protrude downward by a height of at least about 0.1 mm. The convex bottom surface may be a curved surface having a maximum height corresponding to at least about 50% of the thickness of the bottom wall 330. That is, a longitudinal distance between a first virtual horizontal plane at a bottom of the body and a second virtual horizontal plane at a vertex of the convex bottom surface may be equal to or greater than about 50% of a thickness of the bottom wall 330. If the height of the convex bottom surface is too small, the convex bottom surface has a small curvature, so that the bottom wall 330 of the can 300 may not be effectively bent outward when the can 300 is subject to longitudinal compression. In contrast, if the height of the convex bottom surface is too large, the size of the battery increases without increasing its capacity. Accordingly, the height of the convex bottom surface of the bottom wall 330 must be properly determined according to the type and capacity of the battery. The height of the convex bottom surface of the bottom wall 330 may be less than about 2 mm.

Figure 4:
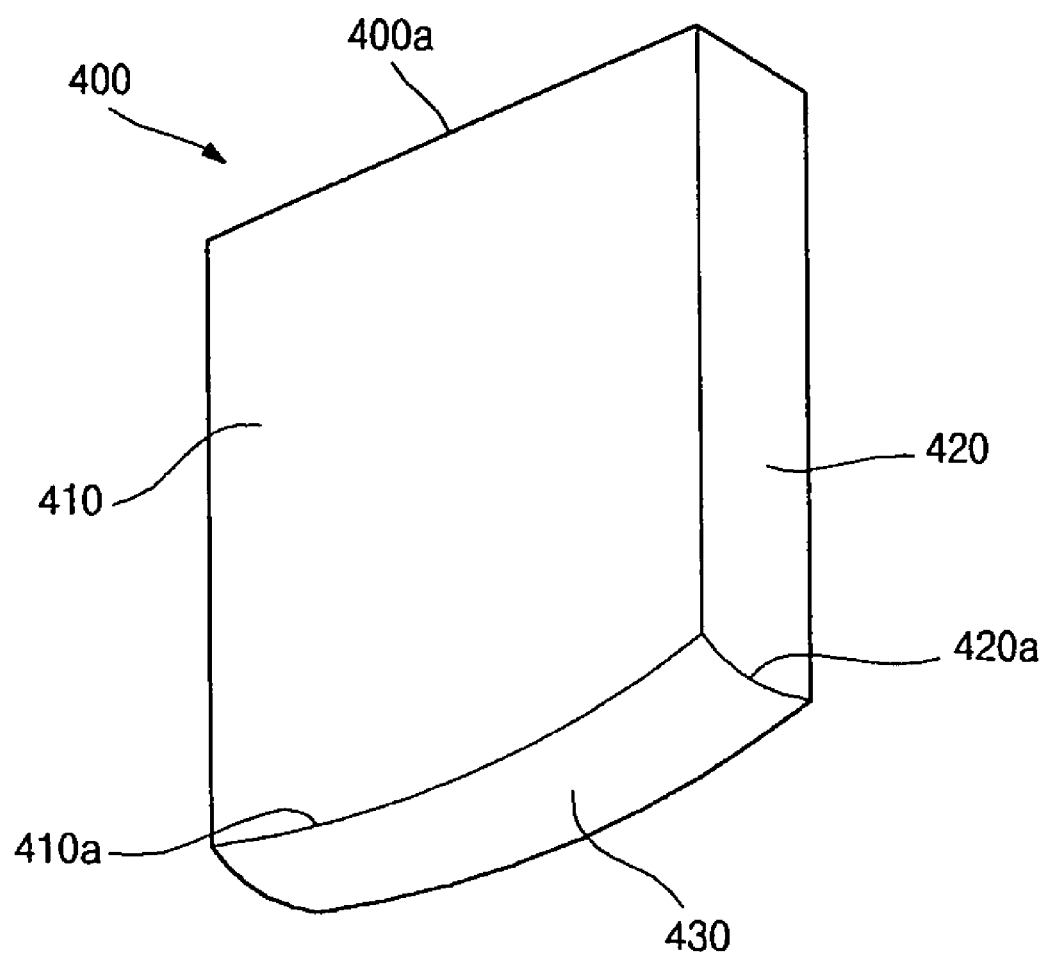
FIG. 4 illustrates a perspective view illustrating a can for a lithium secondary battery according to a third embodiment of the present invention.

FIG. 4 illustrates a perspective view of a can 400 for a battery according to still a third embodiment of the present invention.

Referring to FIG. 4, the can 400 according to the third embodiment of the present invention includes a bottom wall 430 protruding downward while forming a convex bottom surface. In detail, the bottom wall 430 of the can 400 may be rounded both lengthwise and widthwise along long-lateral sides 410a and short-lateral sides 420a thereof (which may also serve as lower sides of front and rear walls 410 and lower sides of lateral sidewalls 420, respectively) in a predetermined curvature. That is, the bottom wall 430 may gradually protrude downward from both long-lateral sides 410a and short-lateral sides 420a thereof, thereby forming the convex bottom surface of the can 400. Thus, the bottom wall 430 has a substantially spherical structure.

The bottom wall 430 may protrude downward by a height of at least about 0.1 mm. The convex bottom surface may be a curved surface having a maximum height corresponding to at least about 50% of the thickness of the bottom wall 430. That is, a longitudinal distance between a first virtual horizontal plane at a bottom of the body and a second virtual horizontal plane at a vertex of the convex bottom surface may be equal to or greater than about 50% of a thickness of the bottom wall 430. If the height of the convex bottom surface is too small, the convex bottom surface has a small curvature, so that the bottom wall 430 of the can 400 may not be effectively bent outward when the can 400 is subject to longitudinal compression. In contrast, if the height of the convex bottom surface is too large, the size of the battery increases without increasing its capacity. Accordingly, the height of the convex bottom surface of the bottom wall 430 must be properly determined according to the type and capacity of the battery. The height of the convex bottom surface of the bottom wall 430 may be less than about 2 mm.

Figure 5A:
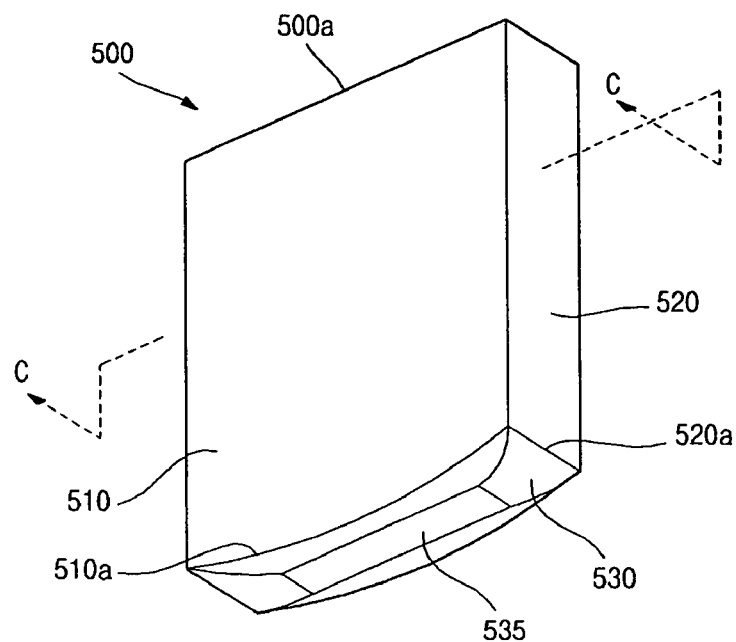
FIG. 5A illustrates a perspective view illustrating a can for a lithium secondary battery according to a fourth embodiment of the present invention.
Figure 5B:
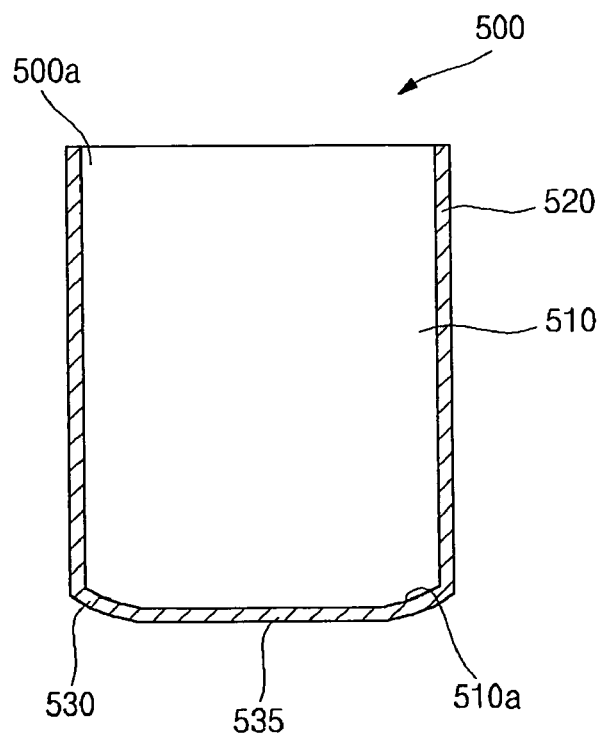
FIG. 5B illustrates a sectional view taken along line C-C shown in FIG. 5A.

FIG. 5A illustrates a perspective view of a can 500 for a battery according to a fourth embodiment of the present invention. FIG. 5B illustrates a sectional view taken along line C-C shown in FIG. 5A.

Referring to FIGS. 5A and 5B, the can 500 according to the fourth embodiment of the present invention includes a bottom wall 530 protruding downward while forming a convex bottom surface of the can 500, in which a planar surface 535 having a predetermined size is formed at the center of the convex bottom surface of the can 500. In detail, the bottom wall 530 of the can 500 is rounded lengthwise along long-lateral sides 510a thereof (which may also serve as lower sides of front and rear walls 510) while forming the planar surface 535 at the center thereof. Preferably, the size of the planar surface 535 corresponds to the size of a lead plate (not shown) to be attached to the bottom wall 530 of the can 500. The lead plate connected to a secondary protective device (not shown) can be welded to the bottom wall 530 of the can 500 according to the type of the lithium secondary battery. Welding is facilitated if a welding section of the bottom wall 530 for the lead plate is planar. Thus, the center portion of the bottom wall 530 making contact with the lead plate is provided with the planar surface 535.

A height of the bottom wall 530, i.e., the height between a root of the bottom wall 530 and the planar surface 535 of the bottom wall 530 may be at least about 0.1 mm. The height of the bottom wall 530 may correspond to at least about 50% of the thickness of the bottom wall 530. If the height of the bottom wall 530 is too small, the bottom wall 530 may not be effectively bent outward when the can 500 is subject to longitudinal compression. In contrast, if the height of the bottom wall 530 is too large, the size of the battery increases without increasing capacity thereof. Accordingly, the height of the bottom wall 530 must be properly determined according to the type and capacity of the battery. The height of the bottom wall 530 may be less than about 2 mm.

Although it is illustrated in FIGS. 5A and 5B that the can 500 has the planar surface 535 at the center of the bottom wall rounded lengthwise along the long-lateral sides thereof, the planar surface can be formed on the center of the bottom wall rounded widthwise along the short-lateral sides thereof as shown in FIGS. 3A and 3B or on the center of the bottom wall rounded lengthwise and widthwise along the long-lateral sides and short-lateral sides as shown in FIG. 4.

Hereinafter, an operation of the can for the battery according to the present invention will be described. While the first embodiment is discussed for illustration, the same principles apply to any of the embodiments or variations thereof.

Referring to FIGS. 2A and 2B, when the can 200, or the battery having the can 200, is bent about the longitudinal axis thereof due to a compression force Fa applied thereto, the bottom wall 230 of the can 200 is bent outward, i.e., downward, rather than inward. Since the bottom wall 230 bends outward, compression is not applied to the lower portion of the electrode assembly (not shown) in the can 200, thus preventing a short circuit between the electrode plates of the electrode assembly and improving safety of the battery.

Although the present invention has been described in relation to the lithium secondary battery, the can of the present invention is also applicable for other batteries.

As described above, according to embodiments of a can for a battery of the present invention, the bottom wall of the can protrudes downward while forming the convex bottom surface in such a manner that the bottom wall of the can is bent outward from the body of the can when the lithium secondary battery is deformed due to compression pressure applied thereto. Thus, external impact is prevented from being applied to the lower portion of the electrode assembly accommodated in the can so that a short circuit is not generated between the electrode plates of the electrode assembly.

Exemplary embodiments of the present invention have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A can for a battery including an electrode assembly having a positive electrode plate, a negative electrode plate and a separator interposed between the positive and negative electrode plates, the can comprising:
   a body to receive the electrode assembly, the body including a front wall opposite a rear wall, and two lateral sidewalls, the front and rear walls and the lateral sidewalls being substantially planar; and
   a bottom wall protruding downward from the body and including:
   a convex surface configured to absorb compression, a vertex of the bottom wall having a height of about 0.1 mm to about 2 mm, and
   a planar surface having a predetermined size.

2. The can as claimed in claim 1, wherein the body has an open substantially box-shaped structure having each of the front and rear walls positioned between the two lateral sidewalls, each of the front and rear walls being perpendicular to the lateral sidewalls.

3. The can as claimed in claim 1, wherein the bottom wall is rounded only lengthwise along long-lateral sides thereof at a predetermined curvature.

4. The can as claimed in claim 1, wherein the bottom wall is rounded only widthwise along short-lateral sides thereof at a predetermined curvature.

5. The can as claimed in claim 1, wherein the bottom wall is rounded lengthwise along entire long-lateral sides thereof at a predetermined curvature and rounded widthwise along entire short-lateral sides thereof at a predetermined curvature.

6. The can as claimed in claim 1, wherein a vertex of the bottom wall has a height of at least about 50% of a thickness of the bottom wall.

7. The can as claimed in claim 1, wherein a surface area of the planar surface is smaller than a surface area of the bottom wall.

8. The can as claimed in claim 1, wherein the planar surface is in a center portion of the bottom wall.

9. The can as claimed in claim 1, wherein the planar surface is at a vertex of the bottom wall.

10. The can as claimed in claim 1, wherein the body and the bottom wall are integral.

11. The can as claimed in claim 1, wherein the body and the bottom wall are a same material.

12. The can as claimed in claim 1, wherein:
   the can includes a lead plate adhered to the planar surface of the bottom wall, the lead plate connects the can to a secondary device, and
   the predetermined size of the planar surface corresponds to a length and a width of a portion of the lead plate in contact with the planar surface, such that the planar surface overlaps substantially the entire length and width of the portion of the lead plate.

13. The can as claimed in claim 1, wherein:
   the planar surface of the bottom wall has four lateral sides; and
   the convex surface of the bottom completely surrounds the lateral sides of the planar surface.

14. A battery, comprising:
   an electrode assembly including a positive electrode plate, a negative electrode plate and a separator interposed between the positive and negative electrode plates; and
   a can including a body accommodating the electrode assembly therein, the body including a front wall opposite a rear wall, and two lateral sidewalls, the front and rear walls and the lateral sidewalls being substantially planar, and a bottom wall, the bottom wall protruding downward from the body and including:
   a convex surface configured to absorb compression, a vertex of the bottom wall having a height of about 0.1 mm to about 2 mm, and
   a planar surface having a predetermined size.

15. The battery as claimed in claim 14, wherein the bottom wall is rounded along at least one of a length and a width thereof at a predetermined curvature.

16. The battery as claimed in claim 14, a vertex of the bottom wall having a height of at least about 50% of a thickness of the bottom wall.

17. The battery as claimed in claim 14, wherein:
   the can includes a lead plate adhered to the planar surface of the bottom wall, the lead plate connects the can to a secondary device, and
   the predetermined size of the planar surface corresponds to a length and a width of a portion of the lead plate in contact with the planar surface, such that the planar surface overlaps substantially the entire length and width of the portion of the lead plate.

18. The battery as claimed in claim 14, wherein:
   the planar surface of the bottom wall has four lateral sides; and
   the convex surface of the bottom completely surrounds the lateral sides of the planar surface.

19. A can for a battery including an electrode assembly having a positive electrode plate, a negative electrode plate and a separator interposed between the positive and negative electrode plates, the can comprising:
   a body with sidewalls to receive the electrode assembly; and
   a portion attached to the body and configured to move away from the body when the body is compressed, the portion including a convex surface and a planar surface having a predetermined size.

* * * * *